Patented Apr. 15, 1941

2,238,030

UNITED STATES PATENT OFFICE 2,238,030

CO-POLYMERS OF CONVERTIBLE ESTERS

Theodore F. Bradley, Stamford, Conn., assignor to American Cyanamid Company, New York, N. Y., a corporation of Maine No Drawing. Application April 1, 1937,
Serial No. 134,387

3 Claims. (Cl. 260—78)

This invention relates to polymers of convertible esters derived from unsaturated monohydric alcohols, and to compositions containing the same. It is especially directed to polymers of esters of allyl alcohol with polycarboxylic acids.

It is well known that many convertible esters may be obtained by combining chemically various polybasic acids and polyhydric alcohols, with or without the use of various modifying agents. These poly esters are generally referred to as being of the alkyd resin type and, where they are heat convertible, the final products may be somewhat lacking in water and alkali-resistance. Ordinarily these alkyd resins are colored by unavoidable impurities and it is seldom possible to obtain resins or esters approaching the more desirable water white color.

It is also true that many monohydric alcohols have been combined with various acids, including polycarboxylic acids, but the esters so obtained are not convertible. In other words, these esters, when heated, generally distil or decompose without being polymerized to an infusible and insoluble form. Esters such as cellulose acetate, poly-vinyl acetate, the poly-methyl and -ethyl esters of acrylic and methacrylic acids and the like are generally water-white and have relatively good water and alkali-resistance, but these materials likewise do not have the property of being converted to the insoluble and infusible form upon heating. This property is essential for the production of most heat resistant coatings, as well as for the more rigid and resistant type of molding or casting resins.

I have found that I can prepare polymerized esters having many interesting and unique characteristics which permit of their use in novel combinations and compositions. I have especially found that I may prepare polymers of the compound, diallyl fumarate, and the following are illustrations of the principles and practice of my invention which is not limited to the specific examples given.

Example 1

I add 40 parts by weight of fumaryl chloride slowly to 60 parts by weight of allyl alcohol. The mixture is allowed to react at room temperature and under anhydrous conditions. After the reaction has proceeded to a sufficient degree, the excess alcohol and hydrogen chloride are removed upon gentle heating under vacuum. The resulting ester remaining is amber-colored and in order to obtain a substantially colorless product, it is fractionated under reduced pressure and there is obtained a 73% yield of water-white diallyl fumarate boiling at 114°–115° at 7 millimeters pressure. The acid number is 2.1, saponification number 575, refractive index 1.4675 at 20° C. and the density 1.063 at $$\frac{23° C.}{15}$$

This liquid ester undergoes spontaneous polymerization at room temperatures during a period of several months, forming a rubber-like, water-white, solid gel comprising a mixture of unpolymerized and polymerized forms of the ester. The ultimate polymer is a hard, water-white, amorphous substance which is infusible and is also insoluble in the various common organic solvents. The polymer is highly water and alkali-resistant and cannot be saponified by the usual methods to yield the alkali salt of fumaric acid.

The polymerization of diallyl fumarate was observed to be greatly accelerated by catalysts such as peroxides, from 0.1% to 1.5% of benzoyl peroxide being especially effective for this purpose. The polymerization is accelerated at elevated temperatures, requiring from 60 to 95 min. at 160° C. in the absence of added catalyst, but only 15 to 30 min. at 115°–125° C. in the presence of from 0.1 to 1.5% of benzoyl peroxide.

For the production of coating compositions it is best to polymerize the diallyl fumarate (or its equivalent) only partially so that while of increased viscosity it is still quite largely soluble in organic solvents. These solutions may then be applied as coatings and then force dried to the converted form at an elevated temperature. In such cases it has usually been found desirable to conduct the polymerization in the presence of a suitable catalyst.

The partially polymerized solution may also be blended with other film-forming agents as for example alkyd resins, bodied oils, alkylated or other hydrocarbon-soluble forms of the urea-formaldehyde and phenol-formaldehyde resins, cellulose esters or ethers and similar compatible materials. In many such cases these blends are more compatible and effective, and products of superior physical characteristics are obtained by effecting chemical reactions between the diverse polymers or their monomers rather than by merely relying upon physical blends. This is especially true of the co-polymers of these esters with the drying oils and/or the alkyd type resins, particularly those modified with drying oils or drying oil acids or both.

I have found that I may prepare an especially valuable product by effecting a chemical reaction between allyl fumarate and vinyl acetate with co-polymerization of these compounds. These reactions may be carried out as follows:

Example 2

| | Parts by weight |
|---|---|
| Vinyl acetate | 232 |
| Diallyl fumarate | 23 |
| Benzoyl peroxide | 0.23 |

When this reaction mixture was heated at 100° C. during a period of 2 hours there was obtained a transparent, water-white, hard and tough co-polymer of infusible and insoluble form. Under similar conditions but in the absence of diallyl fumarate, vinyl acetate formed only a thermoplastic and soluble polymer which lacked the hardness of the co-polymer.

By a more restricted polymerization in the presence of volatile organic solvent co-polymers are obtained which are useful as coating compositions.

By polymerization of the pure esters or of their mixtures with other unsaturated bodies under suitable conditions, as in plaster of Paris or lead molds and the like, there are obtained light-colored or water-white castings of the insoluble and infusible type which can be turned on a lathe or otherwise machined into useful forms. These cast products are characteristically resistant to deformation at high temperatures as well as being highly water and alkali-resistant.

The allyl esters of other polycarboxylic acids such as sebacic acid, adapic acid, succinic acid and phthalic acid may be prepared by substituting the corresponding acid for the fumaric acid described above. The following are illustrations of the preparation of such esters utilizing other available acids:

Example 3

*Diallyl sebacate.*—20 parts by weight sebacyl chloride were heated with 9.8 parts by weight allyl alcohol. A vigorous reaction occurred at the beginning. When this reaction died down, the reaction mixture was heated in a water bath yielding a faint yellow liquid. When heated in the presence of the crystal of benzoyl peroxide, a soft, plastic, flexible gel resulted. When left exposed in sunlight for 72 hours and to the direct light of an ultra violet lamp for 3 hours, no change occurred provided no peroxide was present.

Example 4

*Diallyl succinate.*—15.5 parts by weight of succinyl chloride were added to 11.6 parts by weight allyl alcohol. The reaction was carried out as above. The product produced was a water-white liquid, stable to sunlight and ultra violet light. When boiled with aluminum chloride, a gel resulted which was plastic in nature but not as flexible as the gel produced from diallyl sebacate. No reaction occurred when diallyl succinate was heated with tin tetrachloride. When heated in the presence of benzoyl peroxide, a gel formed with the characteristics already described for the diallyl sebacate.

Example 5

*Diallyl phthalate.*—One mol of phthalyl chloride was reacted with 2 mols allyl alcohol. The resulting product was a crystalline solid. The solid when heated in the presence of benzoyl peroxide as a catalyst produced a mixture of brittle, gelled material and some ungelled crystals.

All of the esters prepared in accordance with Examples 3, 4, and 5 may be purified in the same manner as described in Example 1 to obtain products which give better gels than the crude products of the examples.

It will be obvious that other means of preparing my esters may be utilized and suitable combinations of my esters with other materials may be prepared. Any other desired changes may be adopted without departing from the spirit and scope of my invention except as defined in the appended claims.

I claim:

1. A process of preparing an insoluble and infusible solid which comprises mixing diallyl fumarate with vinyl acetate and heating at about 100° C. for about 2 hours until polymerization is substantially complete.

2. A process of preparing an insoluble and infusible solid which comprises mixing vinyl acetate with an ester selected from the group consisting of diallyl fumarate, diallyl sebacate, diallyl succinate, diallyl adipate and diallyl phthalate, and heating the mixture at a temperature of about 100° C. and for about 2 hours until polymerization is substantially complete and the desired solid is obtained.

3. A composition comprising an insoluble and infusible solid substantially identical with the product obtained by heating a mixture of diallyl fumarate with vinyl acetate for about 2 hours at a temperature of about 100° C. until the polymerization is substantially complete.

THEODORE F. BRADLEY.